(12) United States Patent
Matsui

(10) Patent No.: US 7,432,969 B1
(45) Date of Patent: Oct. 7, 2008

(54) IMAGING APPARATUS, SOLID IMAGING DEVICE AND DRIVING METHOD FOR SOLID IMAGING DEVICE

(75) Inventor: Seiichi Matsui, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1386 days.

(21) Appl. No.: 09/662,323

(22) Filed: Sep. 14, 2000

(30) Foreign Application Priority Data

Sep. 14, 1999 (JP) .................................. 11-260519

(51) Int. Cl.
*H04N 3/14* (2006.01)
*H04N 5/335* (2006.01)

(52) U.S. Cl. ..................... 348/311; 348/320; 348/322

(58) Field of Classification Search .................. 348/266, 348/272–273, 320, 322, 230.1, 311–324, 348/294, 222.1
See application file for complete search history.

(56) References Cited

U.S. PATENT DOCUMENTS 5,668,597 A * 9/1997 Parulski et al. .............. 348/350
6,040,869 A * 3/2000 Dischert ..................... 348/448
6,108,036 A * 8/2000 Harada et al. ............ 348/219.1
6,342,921 B1 * 1/2002 Yamaguchi et al. ......... 348/322
6,593,965 B1   7/2003 Miyamoto et al.
6,661,451 B1  12/2003 Kijima et al.
6,700,607 B1 * 3/2004 Misawa ..................... 348/230.1
6,882,366 B1   4/2005 Kijima et al.

FOREIGN PATENT DOCUMENTS

| JP | 7312714 | 11/1995 |
|---|---|---|
| JP | 9312849 | 12/1997 |
| JP | 9322072 | 12/1997 |
| JP | 10136244 | 5/1998 |
| JP | 10210367 | 8/1998 |
| JP | 11103407 | 4/1999 |

* cited by examiner

*Primary Examiner*—James M. Hannett
*Assistant Examiner*—Kelly Jerabek
(74) *Attorney, Agent, or Firm*—Birch, Stewart, Kolasch & Birch, LLP

(57) ABSTRACT

A CCD has transferring gates to which gate pulses for transferring only pixel information of pairs of two adjoining lines with intervals of a plurality of lines to vertical transferring routes are applied when the image signals with the low definition are produced. Thus, a frame rate can be maintained high and reduced image signals without untrue colors can be obtained.

18 Claims, 6 Drawing Sheets

F I G. 4
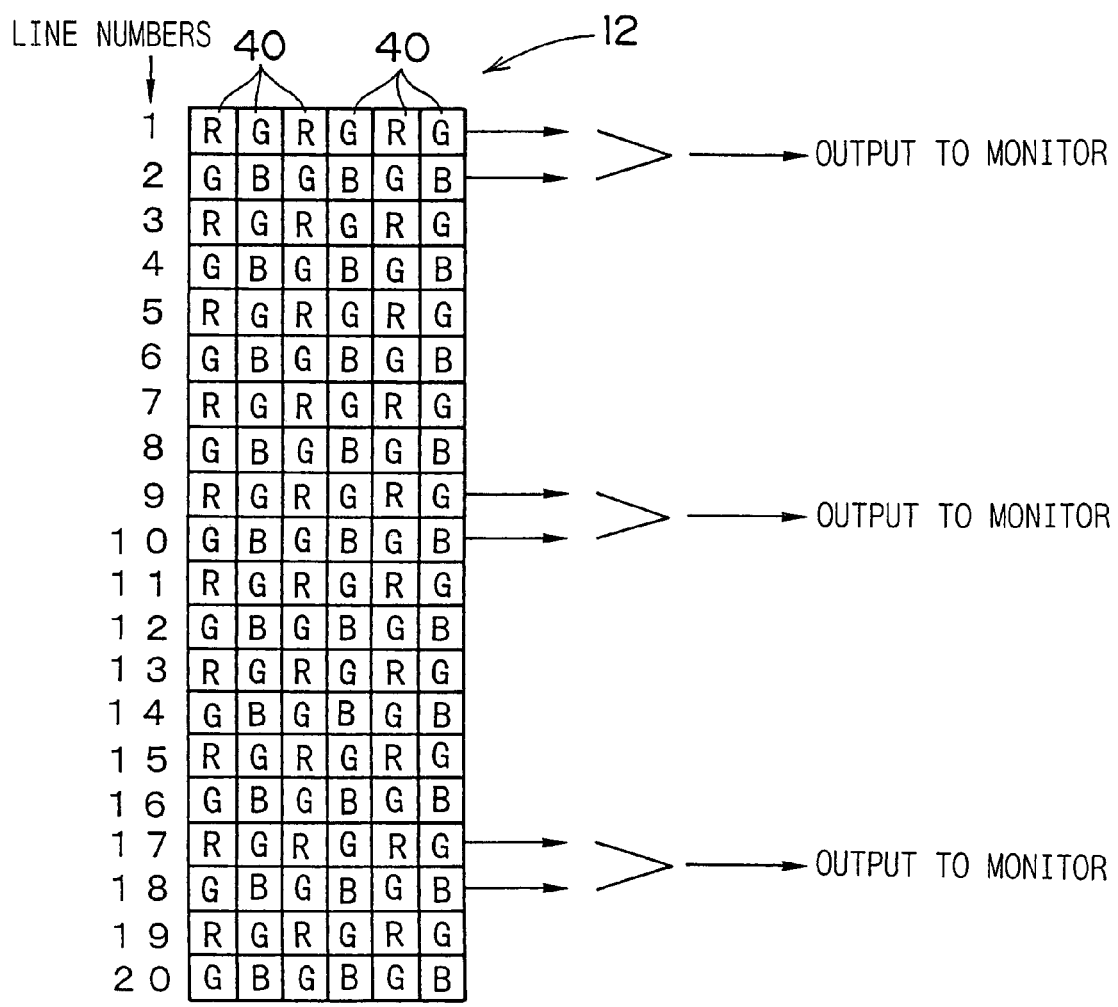

IMAGING APPARATUS, SOLID IMAGING DEVICE AND DRIVING METHOD FOR SOLID IMAGING DEVICE

BACKGROUND OF THE INVENTION

1. Field of the Invention

The present invention generally relates to an imaging apparatus that images a subject with a solid imaging device or a CCD and stores image signals with high definition in a recording device such as a semiconductor memory card, the solid imaging device and the driving method for the solid imaging device. The present invention relates more particularly to an imaging apparatus that reduces data with high definition from a CCD in which pixel data of a plurality of lines composes color information and transmits the data, an imaging method and a solid imaging device.

2. Description of Related Art

The number of pixels of a CCD is sharply rising to improve dispersive power of shot images in recent years. When the images are sequentially displayed on a displaying device, it takes a long time to process the image data from the CCD and the frame rate (updating period of displayed images) is low. To address this problem, Japanese Patent Provisional Publication No. 7-312714 discloses an electronic camera that reduces image signals with high definition acquired from a high-definition-CCD with color filter arrangement of G stripe and R and B complete check or R, G and B stripe to produce image signals with low definition and displays an image.

The electronic camera disclosed in Japanese Patent Provisional Publication No. 7-312714 is effective for the high-definition-CCD with color filter arrangement (G stripe and R and B complete check or R, G and B stripe) in which image data of one line composes color information. However, in case of a CCD with Bayer arrangement in which image data of two lines composes color information, the image easily has untrue colors when intervals at reducing of the image data are long, and thus the quality of the image displayed on a monitor is poor.

An example of a method of reducing data outputted from a CCD with Bayer arrangement is shown in FIG. 6, which is proposed in pending U.S. patent application Ser. Nos. 09/492, 093 and 09/570,733 assigned to the assignee of the present application. In this example, when data outputted from a CCD 112 with Bayer-arranged photoelectrically transferring devices 140 is to be reduced, image data of the first data is obtained from pixel data of the first line and pixel data of the second line and pixel data of the third line through the eighth line is eliminated and image data of the second data is obtained from the pixel data of the second line and pixel data of the ninth line and image data of the third line is obtained from the pixel data of the ninth line and pixel data of the tenth line. In this case, the image data of the first line and the image data of the third line are obtained from the pixel data of the adjoining lines, and thus right image data can be obtained. However, the image data of the second line is obtained from the lines that are not adjoining to each other, and thus the image displayed on the monitor has untrue colors.

SUMMARY OF THE INVENTION

The present invention has been developed in view of the above-described circumstances, and has as its object the provision of an imaging apparatus with a high-definition solid imaging device that can maintain a frame rate high and acquire reduced image signals without untrue colors, an imaging method and the solid imaging device.

To achieve the above-described object, the present invention is directed to a solid imaging device in which pixel information of two adjoining lines composes color information of three primary colors, said solid imaging device comprises transferring gates to which gate pulses for transferring only the pixel information of pairs of two adjoining lines with intervals of a plurality of lines to vertical transferring routes are applied when image signals with low definition are produced.

According to the present invention, the solid imaging device has the transferring gates to which the gate pulses for transferring only the pixel information of the pairs of two adjoining lines with the intervals of a plurality of lines to the vertical transferring routes are applied when the image signals with the low definition are produced. Thus, the frame rate can be maintained high and the reduced image signals without untrue colors can be obtained.

To achieve the above-described object, the present invention is directed to an imaging apparatus comprising: said solid imaging device; a shooting optical system that forms a subject image on a receiving surface of said solid imaging device; a timing generator that drives said solid imaging device and reads pixel information from said solid imaging device, the timing generator applying gate pulses for transferring only pixel information of pairs of two adjoining lines with intervals of a plurality of lines to vertical transferring routes to said transferring gates when image signals with low definition are produced; and a signal processing device that produces the image signals by producing pixel information of one line from the pixel information of each pair of two adjoining lines read from said solid imaging device when the image signals with the low definition are produced.

According to the present invention, the imaging apparatus has the solid imaging device; the shooting optical system that forms the subject image on the receiving surface of the solid imaging device; the timing generator that drives the solid imaging device and reads the pixel information from the solid imaging device, the timing generator applying the gate pulses for transferring only the pixel information of the pairs of two adjoining lines with the intervals of a plurality of lines to the vertical transferring routes to the transferring gates when the image signals with the low definition are produced; and the signal processing device that produces the image signals by producing the pixel information of one line from the pixel information of each pair of two adjoining lines read from the solid imaging device when the image signals with the low definition are produced. Thus, the imaging apparatus can maintain the frame rate high and obtain the reduced image signals without untrue colors.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a graph diagram showing a signal processing in which the data is reduced to ¼ and outputted as image signals with low definition to display the image on the monitor in case of the CCD with Bayer arrangement;

DETAILED DESCRIPTION OF THE PREFERRED EMBODIMENT

Hereunder the preferred embodiment of the present invention is explained in detail according to the accompanying drawings.

Figure 1:
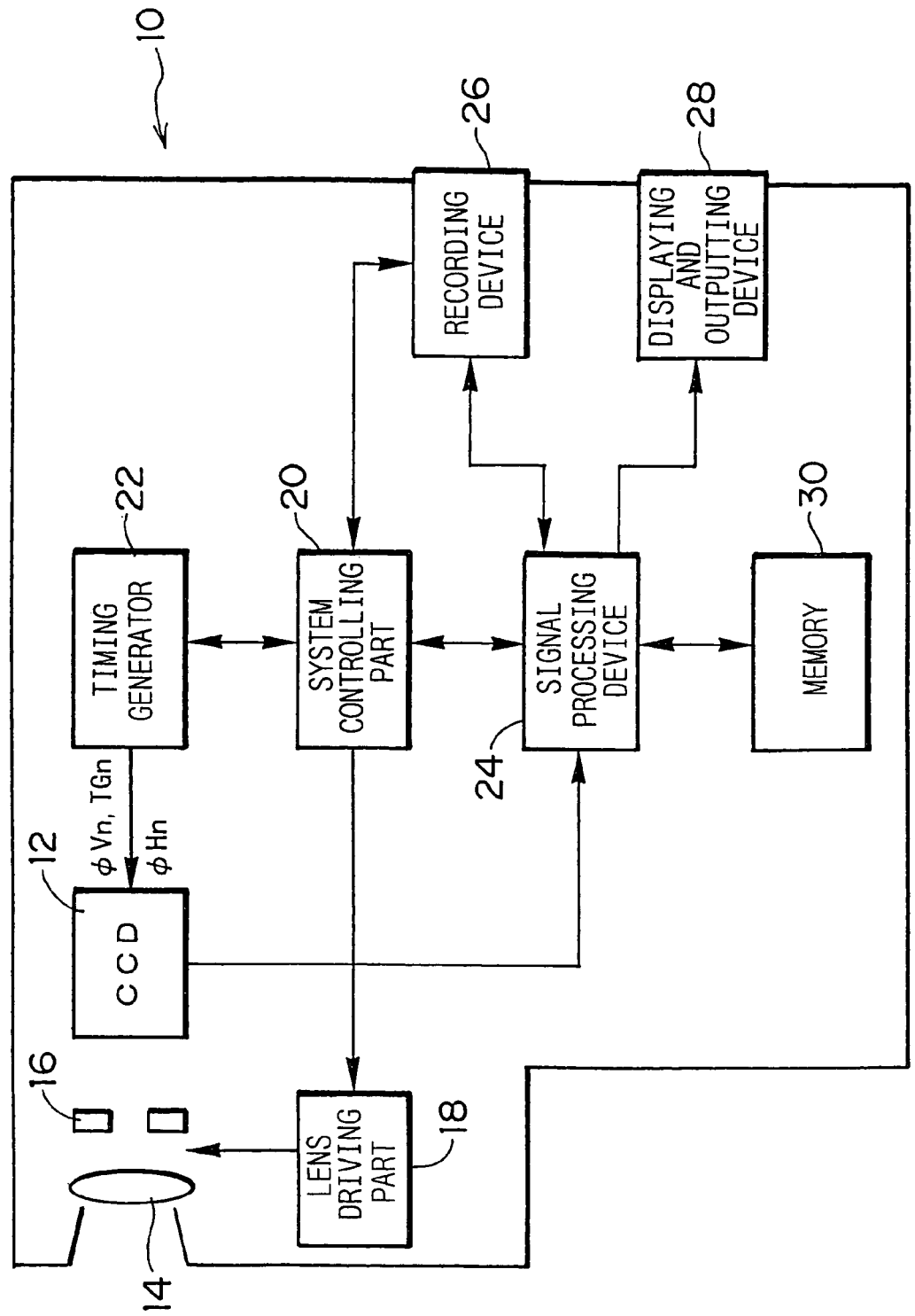
FIG. 1 is a block diagram showing the structure of an imaging apparatus according to the present invention.

FIG. 1 is a block diagram showing the structure of an imaging apparatus according to the present invention.

As shown in FIG. 1, an electronic camera 10 that is an embodiment of the imaging apparatus comprises a lens 14 that forms a subject image on a CCD 12, a diaphragm 16 that adjusts an amount of light reaching the CCD 14, a lens driving part 18 that adjusts the position where the subject image is formed on the CCD 12, a system controlling part 20 that performs control of the whole electronic camera 10, for example, control of the lens driving part 18 and processing of imaging signals, the CCD 12 and a timing generator 22 that transmits timing signals controlling a reduction rate, a frame rate and a pixel number of image data to synchronize the CCD 12 and the system controlling part 20. The electronic camera 10 also comprises a signal processing part 24 that performs sharpness correction, gamma correction, contrast correction, white balance correction, YC conversion, compression and so on of image data, a recording device 26 that records the shot image, a displaying and outputting device 28 that displays the processed image data or outputs the image data to the outside and a memory 30 that temporarily stores the image data.

The operation of the electronic camera 10 constructed as described above will now be explained.

When the user sets the electronic camera 10 to a shooting mode, the subject image formed on the CCD 12 is reduced for a frame rate and a data amount suitable for display and transmitted to the displaying device through the signal processing device 24, and the displaying device displays the image.

Then, the user turns the electronic camera 10 to the subject, and presses a shutter release button (not shown) to perform a shooting after determining the camera angle, the focus and the exposure while looking at the image displayed by the displaying device.

The data of the image formed on the CCD 12 and displayed is recorded in the recording device 26 with a preset frame rate and pixel number.

The method of reducing the image data will now be explained.

Figure 2:
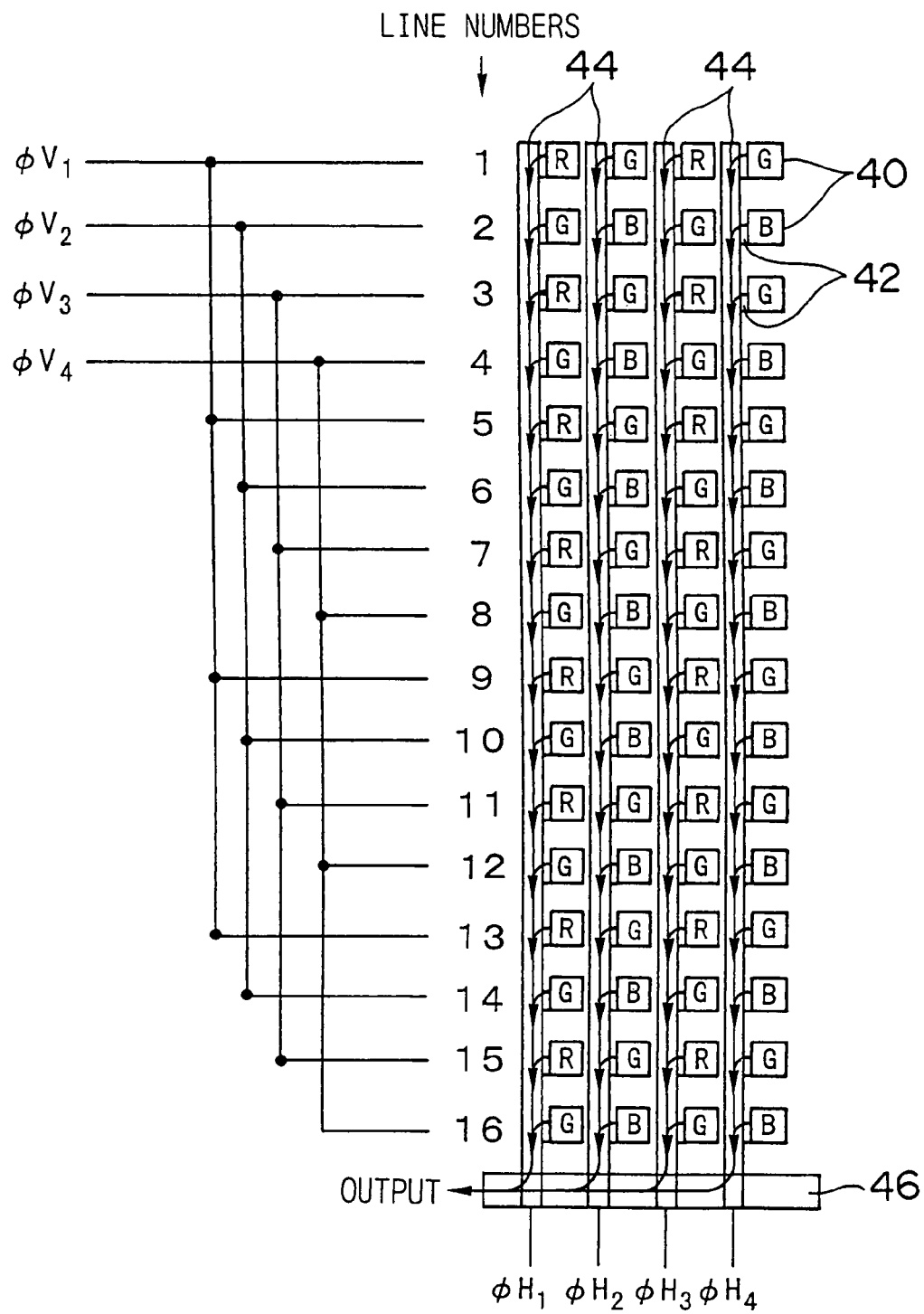
FIG. 2 is a diagram showing a method of obtaining image signals with high definition and an imaging method in case of a CCD with filter arrangement in which pixel data of two adjoining lines compose color information.

FIG. 2 is a diagram showing a method of obtaining image signals with high definition and an imaging method in case of a CCD with filter arrangement in which pixel data of two adjoining lines compose color information.

As shown in FIG. 2, (1+2n)-th lines (n=0, 1, 2, 3, ...) of the CCD 12 have photoelectrically-transferring devices 40 with filter arrangement of R, G, R and G, and (2+2n)-th lines have photoelectrically-transferring devices 40 with filter arrangement of G, B, G and B.

The photoelectrically-transferring devices 40 convert received lights into electric charges, and the accumulated electric charges are transferred to vertical transferring routes 44 through transferring gates 42 adjoining to the photoelectrically-transferring devices 40. The transferring gates 42 generally open and close on the line-by-line basis according to gate pulses TGn.

The electric charges acquired by the photoelectrically-transferring devices 40 are sequentially transferred downward in FIG. 2 according to vertically-transferring pulses $\phi V1$-$\phi V4$. One end of each vertical transferring route 44 is connected to a horizontal transferring route 46, and the electric charges transferred from the vertical transferring routes 44 are sequentially transferred to the left in FIG. 2 according to horizontally-transferring pulses $\phi H1$-$\phi H4$ and outputted from the CCD 12.

Generally, the same signal line is used for the gate pulses TGn and the vertically-transferring pulses $\phi V1$-+$\phi V4$. For example, the CCD 12 is constructed so that the transferring gates 42 open when a positive voltage is applied to the signal line and the transferring gates 42 close when a zero or negative voltage is applied to the signal line. Also, the CCD 12 is constructed so that gates of the vertical transferring routes 44 are controlled to transfer the photoelectrically-transferred electronic charges when a negative voltage is applied to the signal line. Thus, the number of the control lines of the CCD 12 can be reduced to the minimum and the CCD 12 can be small and easy to control.

The operation of the CCD 12 constructed as described above will now be explained.

When the transferring gates 42 are closed, the electric charges corresponding to the amounts of the received lights are accumulated in the photoelectrically-transferring devices 40. When the electric charges are to be outputted from the photoelectrically-transferring devices 40, the transferring gates 42 adjoining to the photoelectrically-transferring devices 40 are opened when the gate pulses TGn are given, and the accumulated electric charges are outputted to the vertical transferring routes 44. In FIG. 2, the gate pulses TG1-TG16 are given at one time to output the data of all the lines to the vertical transferring routes 44 at one time. If the accumulated electric charges are divided into data of two fields, data of alternate lines is outputted to the vertical transferring routes 44.

The electric charges transferred to the vertical transferring routes 44 are sequentially transferred downward in FIG. 2 according to the vertically-transferring pulses $\phi V1$-$\phi V4$. The electric charges transferred from the vertical transferring routes 44 are sequentially transferred to the left in FIG. 2 on the line-by-line basis according to the horizontally-transferring pulses $\phi H1$-$\phi H4$ and outputted from the CCD 12. If the data of all the lines are outputted from the CCD 12, data of the sixteenth line, the fifteenth line, ..., the second line, the first line is outputted in that order.

If the electric charges are divided into data of two fields, data of the sixteenth line, the fourteenth line, the twelfth line, ..., the second line is sequentially outputted in that order as the data of the first field, and then data of the fifteenth line, the thirteenth line, the eleventh line, ..., the first line is sequentially outputted in that order as the data of the second field. The acquired image data of the fields is temporarily stored in the memory 30. The signal processing device 24 reads the image data stored in the memory 30 and converts the image data into R, G and B signals by combining the image data of the fields.

Figure 3:
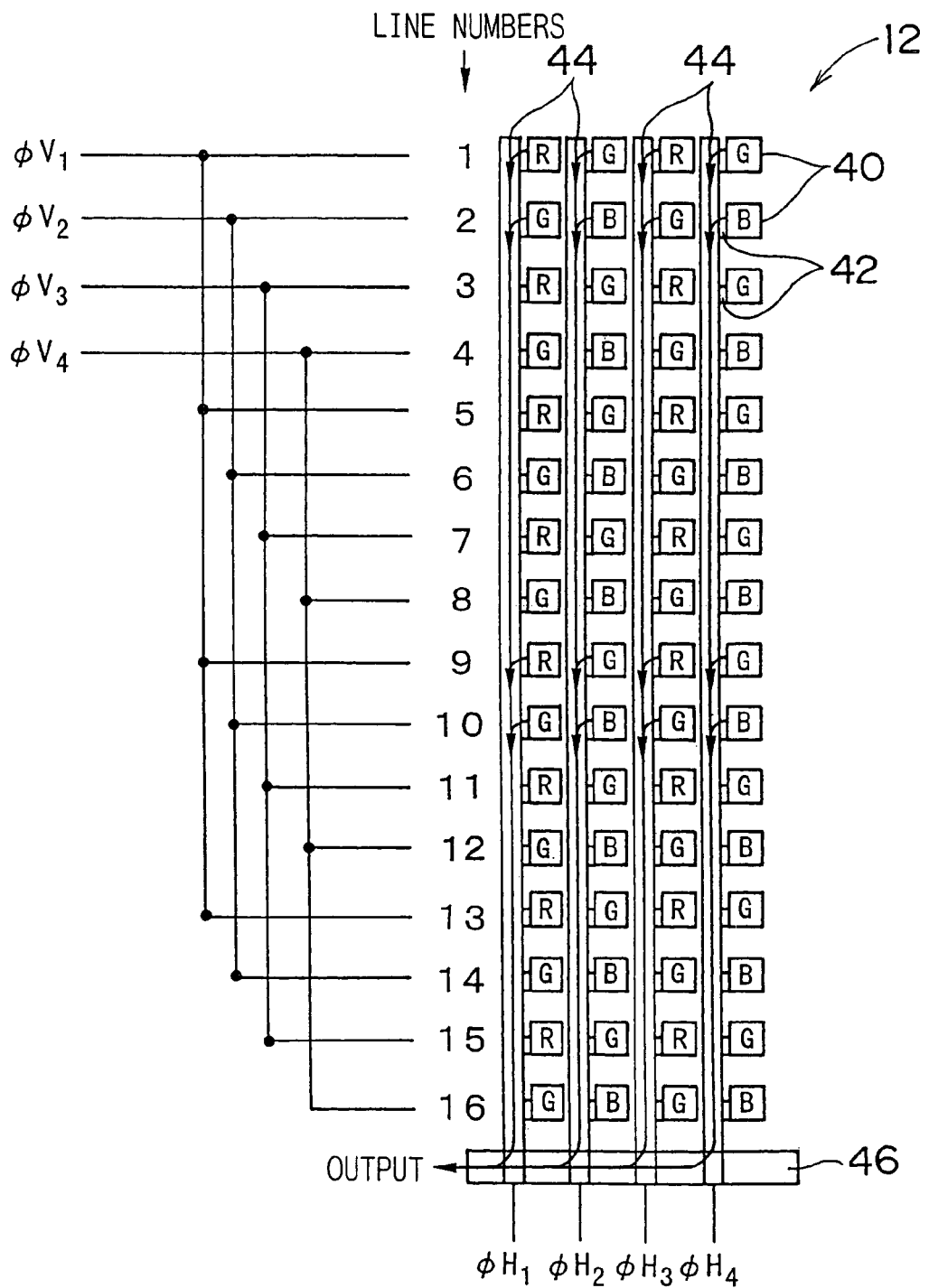
FIG. 3 is a diagram showing the outputting method in case the pixel data of the CCD with filter arrangement in which pixel data of two adjoining lines compose color information is reduced to ¼ to be outputted as image signals with low definition.

FIG. 3 is a diagram showing the outputting method in case the pixel data of the CCD with filter arrangement in which pixel data of two adjoining lines compose color information is reduced to ¼ to be outputted as image signals with low definition.

In FIG. 3, the gate pulses TG1, TG2, TG9 and TG10 are given at one time so that the data of the third-eighth lines and the eleventh-sixteenth lines is eliminated.

The electric charges of the first, the second, the ninth and the tenth lines transferred to the vertical transferring routes 44 are sequentially transferred downward in FIG. 2 according to the vertically-transferring pulses φV1-φV4. The electric charges transferred from the vertical transferring routes 44 are sequentially transferred to the left in FIG. 2 according to the horizontally-transferring pulses φH1-φH4 and outputted from the CCD 12. The data of the tenth line, the ninth line, the second line and the first line is sequentially outputted from the CCD 12 in that order.

To eliminate the electric charges of the third-eighth lines and the eleventh-sixteenth lines, a drain (not shown) may be connected to the vertical transferring routes 44 on the opposite side from the horizontal transferring routes 46, and over flow drains similar to the transferring gates 42 are provided to the photoelectrically-transferring devices 40.

The system controlling part 20 outputs instructions for controlling the gate pulses TGn to the timing generator 22, and the reading method is selected according to the definition of the displaying device and the mode. For example, the data of all the pixels is read when the image is to be recorded in the recording device 26, and the data of the pixels is reduced to ½ to be read when the image is to be displayed on only the TV monitor, and the data of the pixels is reduced to ¼ to be read when the image is to be displayed on only the LCD monitor. The signal processing device 24 is controlled by the system controlling part 20, and a signal processing method is selected according to the mode.

The gate pulses TGn are controlled on the line-by-line basis and the data of the horizontal lines are eliminated in the above explanation, but data of vertical pixels may be eliminated, and the signal processing device 24 may reduce the electric charges outputted from the horizontal transferring routes 46.

FIG. 4 shows the signal processing in which the data is reduced to ¼ and outputted as image signals with low definition to display the image on the monitor in case of the CCD with Bayer arrangement.

R, G and B data of the first line is produced from the R, G, R, G, R and G data of the first line and the G, B, G, B, G and B data of the second line. R, G and B data of the second line is produced not from the G, B, G, B, G and B data of the second line and the R, G, R, G, R and G data of the ninth line but from the R, G, R, G, R and G data of the ninth line and the G, B, G, B, G and B data of the tenth line. The R, G and B data for monitor display is sequentially produced from only data of the adjoining lines in this way, and thus the clear image without untrue colors can be displayed on the monitor even if some lines are eliminated.

In the embodiment, the CCD has Bayer arrangement and six consecutive lines are eliminated, but the present invention is not limited to this and the number of the eliminated lines can be changed according to the structure of the system.

Figure 5:
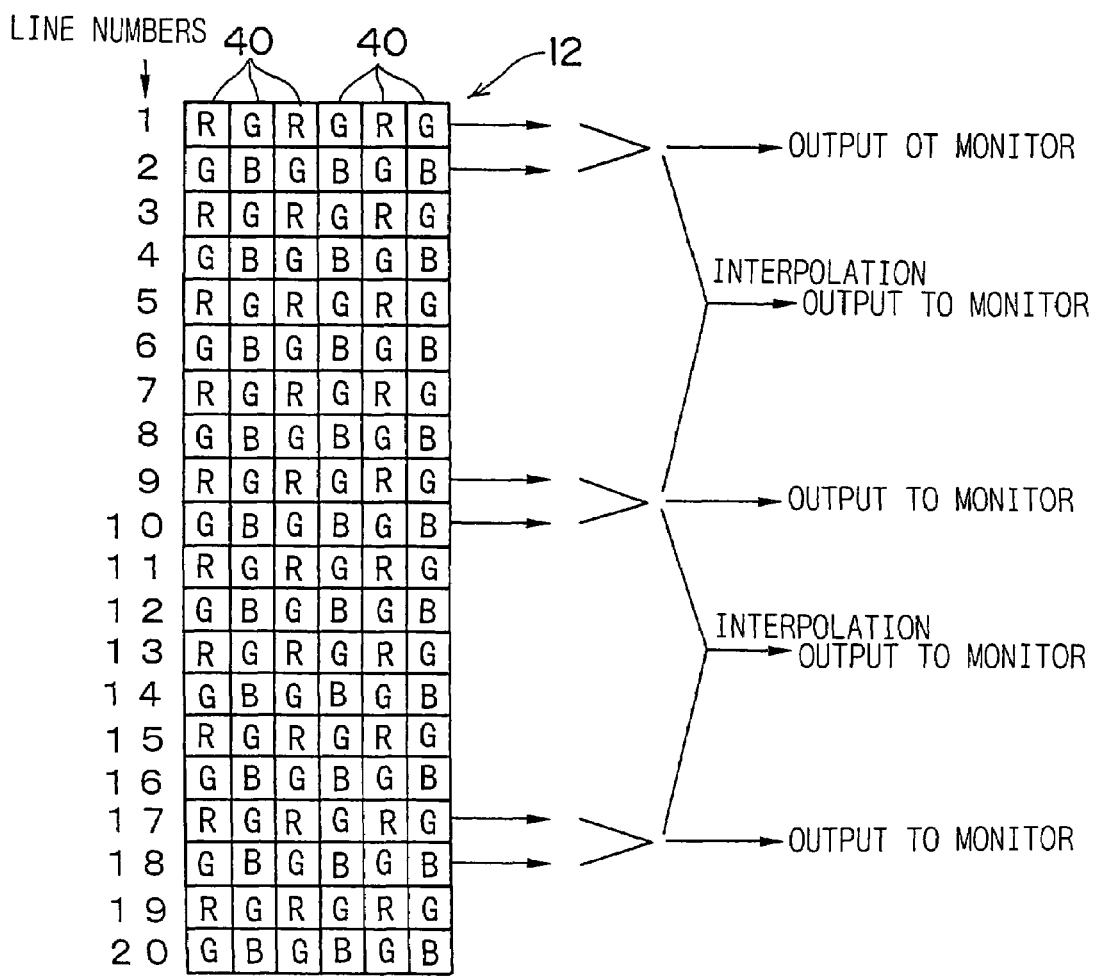
FIG. 5 is a diagram showing a signal processing and the interpolation in which the data is reduced to ¼ and outputted as image signals with low definition to display the image on the monitor in case of the CCD with Bayer arrangement.
Figure 6:
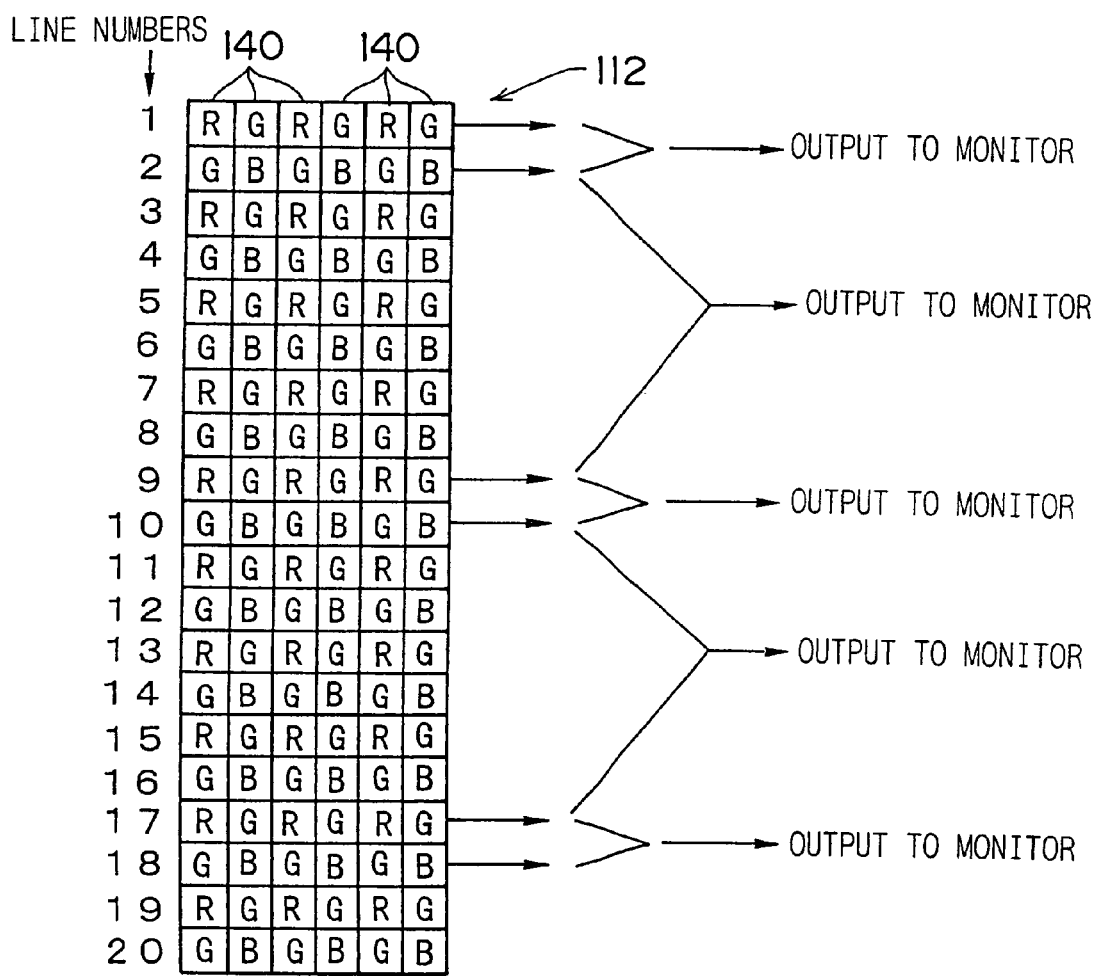
FIG. 6 is a diagram showing a comparative example of a method of reducing data outputted from a CCD.

FIG. 5 shows the signal processing and the interpolation in which the data is reduced to ¼ and outputted as image signals with low definition to display the image on the monitor in case of the CCD with Bayer arrangement.

As shown in FIG. 5, the data is reduced in the same way as in FIG. 4 and the signal processing device 24 interpolates the reduced data with average values and so on to display the image on the monitor. The reduced data is interpolated to display the image on the monitor in this way, and thus the dispersive power can be improved while the frame rate can be maintained high.

As explained above, the solid imaging device according to the present invention has the transferring gates to which the gate pulses for transferring only the pixel information of the pairs of two adjoining lines with the intervals of a plurality of lines to the vertical transferring routes are applied when the image signals with the low definition are produced. Thus, the frame rate can be maintained high and the reduced image signals without untrue colors can be obtained.

As explained above, the imaging apparatus according to the present invention has the solid imaging device; the shooting optical system that forms the subject image on the receiving surface of the solid imaging device; the timing generator that drives the solid imaging device and reads the pixel information from the solid imaging device, the timing generator applying the gate pulses for transferring only the pixel information of the pairs of two adjoining lines with the intervals of a plurality of lines to the vertical transferring routes to the transferring gates when the image signals with the low definition are produced; and the signal processing device that produces the image signals by producing the pixel information of one line from the pixel information of each pair of two adjoining lines read from the solid imaging device when the image signals with the low definition are produced. Thus, the imaging apparatus can maintain the frame rate high and obtain the reduced image signals without untrue colors.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An imaging apparatus comprising:
   a solid imaging device in which pixel information of two adjoining lines composes color information of three primary colors, said solid imaging device comprises a matrix of transferring gates, to which gate pulses for transferring only the pixel information of pairs of two adjoining lines with intervals of a plurality of lines to vertical transferring routes are applied when image signals with low definition are produced;
   a shooting optical system that forms a subject image on a receiving surface of said solid imaging device;
   a timing generator that drives said solid imaging device and reads pixel information from said solid imaging device, the timing generator applying gate pulses for transferring only pixel information of pairs of two adjoining lines with intervals of a plurality of lines to vertical transferring routes to said transferring gates when image signals with low definition are produced; and
   a signal processing device that produces the image signals by producing pixel information of one line from the pixel information of each pair of two adjoining lines read from said solid imaging device when the image signals with the low definition are produced.

2. The imaging apparatus as set forth in claim 1, wherein said timing generator applies gate pulses for transferring pixel information of all the vertical lines to said vertical transferring routes without reducing the pixel information to said transferring gates at least when image signals with high definition are produced.

3. The imaging apparatus as set forth in claim 1, wherein said timing generator applies gate pulses for dividing pixel information of all the vertical lines into pixel information of a plurality of fields to transfer the pixel information to said vertical transferring routes to said transferring gates at least when image signals with high definition are produced.

4. The imaging apparatus as set forth in claim 1, wherein said signal processing device reduces pixel information of horizontal lines when image signals with low definition are produced.

5. The imaging apparatus as set forth in claim 1, wherein:
said signal processing device has an interpolation operation device that interpolates the image signals with the low definition to produce image signals; and
said signal processing device outputs image signals including the produced image signals.

6. The imaging apparatus as set forth in claim 1, further comprising a displaying device that displays a shot image according to the image signals with the low definition.

7. The imaging apparatus as set forth in claim 1, further comprising a recording device that records the image signals of the high definition.

8. A driving method for a solid imaging device in which pixel information of two adjoining lines composes color information of three primary colors, comprising the steps of:
applying gate pulses for transferring pixel information of all vertical lines to vertical transferring routes without reducing the pixel information to a matrix of transferring gates when image signals with high definition are produced;
applying gate pulses for transferring only pixel information of pairs of two adjoining lines with intervals of a plurality of lines to said vertical transferring routes to said matrix of transferring gates when image signals with low definition are produced; and
producing pixel information of one line from the pixel information of each pair of two adjoining lines read from said solid imaging device when the image signals with the low definition are produced.

9. A driving method for a solid imaging device in which pixel information of two adjoining lines composes color information of three primary colors, comprising the steps of:
applying gate pulses for dividing pixel information of all vertical lines into pixel information of a plurality of fields and transferring the pixel information to vertical transferring routes to a matrix of transferring gates when image signals with high definition are produced;
applying gate pulses for transferring only pixel information of pairs of two adjoining lines with intervals of a plurality of lines to said vertical transferring routes to said matrix of transferring gates when image signals with low definition are produced; and
producing pixel information of one line from the pixel information of each pair of two adjoining lines read from said solid imaging device when the image signals with the low definition are produced.

10. An imaging apparatus comprising:
a solid imaging device in which pixel information of two adjoining lines composes color information of three primary colors, said solid imaging device comprises transferring gates, each associated with a photoelectric transferring device, to which gate pulses for transferring only the pixel information of pairs two adjoining lines with intervals of a plurality of lines to vertical transferring routes are applied when image signals with low definition are produced;
a shooting optical system that forms a subject image on a receiving surface of said solid imaging device;
a timing generator that drives said solid imaging device and reads pixel information from said solid imaging device, the timing generator applying gate pulses for transferring only pixel information of pairs of two adjoining lines with intervals of a plurality of lines to vertical transferring routes to said transferring gates when image signals with low definition are produced; and
a signal processing device that produces the image signals by producing pixel information of one line from the pixel information of each pair of two adjoining lines read from said solid imaging device when the image signals with the low definition are produced.

11. The imaging apparatus as set forth in claim 10, wherein said timing generator applies gate pulses for transferring pixel information of all the vertical lines to said vertical transferring routes without reducing the pixel information to said transferring gates at least when image signals with high definition are produced.

12. The imaging apparatus as set forth in claim 10, wherein said timing generator applies gate pulses for dividing pixel information of all the vertical lines into pixel information of a plurality of fields to transfer the pixel information to said vertical transferring routes to said transferring gates at least when image signals with high definition are produced.

13. The imaging apparatus as set forth in claim 10, wherein said signal processing device reduces pixel information of horizontal lines when image signals with low definition are produced.

14. The imaging apparatus as set forth in claim 10, wherein:
said signal processing device has an interpolation operation device that interpolates the image signals with the low definition to produce image signals; and
said signal processing device outputs image signals including the produced image signals.

15. The imaging apparatus as set forth in claim 10, further comprising a displaying device that displays a shot image according to the image signals with the low definition.

16. The imaging apparatus as set forth in claim 10, further comprising a recording device that records the image signals of the high definition.

17. A driving method for a solid imaging device in which pixel information of two adjoining lines composes color information of three primary colors, comprising the steps of:
applying gate pulses for transferring pixel information of all vertical lines to vertical transferring routes without reducing the pixel information to transferring gates, each associated with a photoelectric transferring device, when image signals with high definition are produced;
applying gate pulses for transferring only pixel information of pairs of two adjoining lines with intervals of a plurality of lines to said vertical transferring routes to said transferring gates when image signals with low definition are produced; and
producing pixel information of one line from the pixel information of each pair of two adjoining lines read from said solid imaging device when the image signals with the low definition are produced.

18. A driving method for a solid imaging device in which pixel information of two adjoining lines composes color information of three primary colors, comprising the steps of:
applying gate pulses for dividing pixel information of all vertical lines into pixel information of a plurality of fields and transferring the pixel information to vertical transferring routes to transferring gates, each associated with a photoelectric transferring device, when image signals with high definition are produced;
applying gate pulses for transferring only pixel information of pairs of two adjoining lines with intervals of a plurality of lines to said vertical transferring routes to said transferring gates when image signals with low definition are produced; and producing pixel information of one line from the pixel information of each pair of two adjoining lines from said solid imaging device when the image signals with the low definition are produced.

* * * * *